United States Patent Office 3,364,147
Patented Jan. 16, 1968

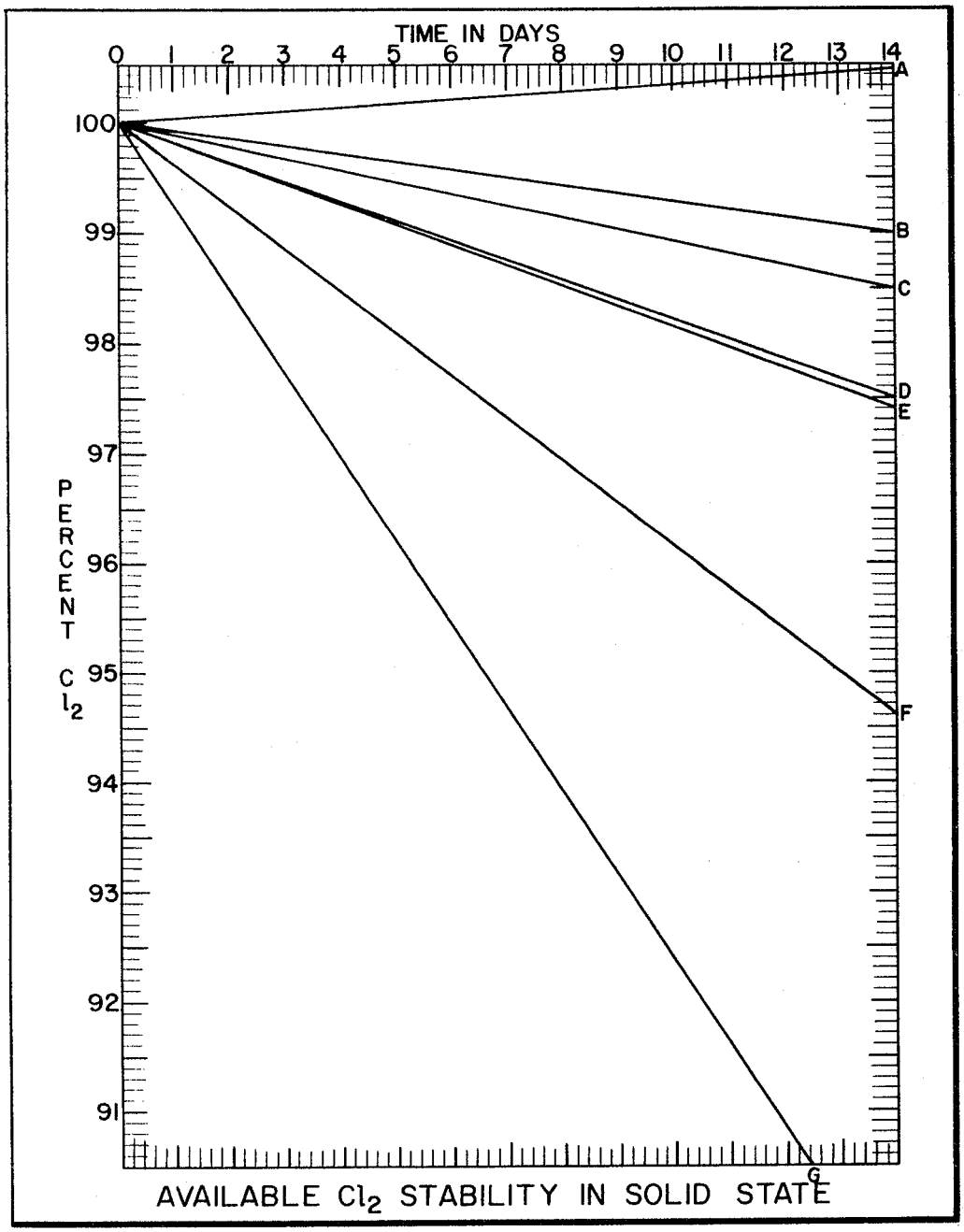

3,364,147
STABILIZED CHLORINATED TRISODIUM
PHOSPHATE AND PROCESS
James K. Stamm, Erlanger, Ky., assignor to W. R. Grace
& Co., New York, N.Y., a corporation of Connecticut
Continuation-in-part of application Ser. No. 228,831,
Oct. 8, 1962. This application Feb. 6, 1967, Ser.
No. 614,314
10 Claims. (Cl. 252—99)

ABSTRACT OF THE DISCLOSURE

Triple salt bleaching compounds having the formulae $Na_3PO_4:0.25NaOCl:0.0005-0.32Na_5P_3O_{10}:10.5-11.5H_2O$
$Na_3PO_4:0.25NaOCl:0.0014-0.77Na_4P_2O_7:10.5-11.5H_2O$
$Na_3PO_4:0.25NaOCl:0.0003-$
$\qquad 0.018(NaPO_3)_6:10.5-11.5H_2O$ are prepared from trisodium phosphate, sodium hypochlorite and the respective condensed phosphate. The sodium hypochlorite is added to a melt of trisodium phosphate and the condensed phosphate, and the melt is cooled to form the triple salt.

---

This invention relates to a new chlorinated trisodium phosphate compound having improved chlorine stability and to a process for preparing it.

This application is a continuation-in-part of application Ser. No. 228,831 filed Oct. 8, 1962, and now abandoned.

In summary the hydrated triple salt of this invention is selected from the group of triple salts having the following empirical formulae, expressed in terms of mole ratios of components:

(a) $Na_3PO_4:0.25NaOCl:0.0005-$
$\qquad 0.032Na_5P_3O_{10}:10.5-11.5H_2O$
(b) $Na_3PO_4:0.25NaOCl:0.0014-$
$\qquad 0.077Na_4P_2O_7:10.5-11.5H_2O$
(c) $Na_3PO_4:0.25NaOCl:0.003-$
$\qquad 0.018(NaPO_3)_6:10.5-11.5H_2O$ In summary the process of this invention is a method for preparing a chlorinated trisodium phosphate-condensed phosphate hydrated triple salt comprises first mixing trisodium phosphate liquor with 0.1 to 5 percent, based on the weight of the final product, of a condensed phosphate selected from the group consisting of sodium tripolyphosphate, tetrasodium pyrophosphate and sodium hexametaphosphate. An aqueous solution of sodium hypochlorite having a chlorine content of 10–23 percent is then added to the liquor at a temperature of from 80–100° C. The liquor is immediately cooled, thereby forming a crystalline triple salt product.

The hypochlorites, especially sodium hypochlorite (NaOCl), are highly effective bleaching agents, disinfectants and cleaning agents. However, in the form of uncombined or single salts, they tend to decompose rapidly, losing their chlorine content. For this and other reasons, hypochlorites are often used in commerce in the more stable form of so-called chlorinated trisodium phosphate. In this compound, the hypochlorite is combined with trisodium phosphate (TSP) in the form of a hydrated double salt, the formula of which is usually given as $Na_3PO_4 \cdot \frac{1}{4}NaOCl \cdot 11H_2O$ and hereinafter described as chlorinated trisodium phosphate.

Chlorinated trisodium phosphate is prepared, in accordance with one standard technique, by making a molten or supersaturated solution of trisodium phosphate dodecahydrate, $Na_3PO_4 \cdot 12H_2O$, at a temperature above about 80° C., and adding the hypochlorite in the form of NaOCl to the TSP liquor. Upon cooling, the hydrated double salt forms as a crystalline mass.

In this form the hypochlorite is more stable than in the uncombined form. Nonetheless, chlorinated TSP does lose its chlorine content at a rate which is higher than is desirable. Various methods have been proposed in the past for stabilizing the chlorine content of chlorinated TSP.

It is an object to provide new chlorinated trisodium phosphates having improved chlorine stability, and to provide a method for preparing these phosphates.

The graph shows the chlorine stability of chlorinated TSP and the triple salts of this invention.

This invention is based upon the discovery that alkali metal salts, in particular the sodium salts of condensed phosphates, can be combined chemically as triple salts with chlorinated trisodium phosphate to produce products which demonstrate chlorine stabilities distinctly better than those of conventional chlorinated trisodium phosphate. Surprisingly, a remarkable improvement in chlorine stability is obtained if the secondary phosphate is added in an amount less than about 5 percent by weight of the final product. Examples of such condensed sodium phosphates which I have found can be combined with trisodium phosphate and sodium hypochlorite to form a product having improved chlorine stability include sodium tripolyphosphate, $Na_5P_3O_{10}$ (commonly referred to as STP), tetrasodium pyrophosphate, $Na_4P_2O_7$ (commonly referred to as TSPP), or sodium hexametaphosphate, $(NaPO_3)_6$, either individually or in admixture with each other. The most favorable results are demonstrated when sodium tripolyphosphate ($Na_5P_3O_{10}$) is used.

Although I do not wish to be limited in this regard, it is presently believed that the trisodium phosphate, sodium hypochlorite and the condensed phosphate combine as a hydrated triple salt. Whatever its exact nature may be, however, I have found that this new composition of matter demonstrates a chlorine stability which is better than that of conventional chlorinated trisodium phosphate.

The method of this invention comprises combining chlorinated trisodium phosphate with from 0.1 to 5 percent and preferably about 2 percent condensed phosphate based on the weight of the final product.

The preferred procedure comprises first forming a melt of trisodium phosphate and the condensed phosphate. A trisodium phosphate liquor can be formed by reacting a sodium hydroxide solution with phosphoric acid, and the condensed phosphate can be dissolved in the liquor in the molar proportions desired in the final product to form the melt. Suitable condensed phosphates include sodium tripolyphosphate, the preferred condensed phosphate, tetrasodium pyrophosphate, and sodium hexametaphosphate. The condensed phosphate is preferably added in anhydrous form to prevent the water content of the solution from becoming excessive. The condensed phosphate may be added in hydrated form if the water content of the TSP is adjusted accordingly. The condensed phosphate concentration can range up to 5 weight percent based on the weight of trisodium phosphate dodecahydrate. Above 5 percent, it becomes difficult or impossible to dissolve additional quantities of the condensed phosphate in the liquor, and this consideration therefore appears to establish the upper limit of the quantity of condensed phosphate which may be added.

The melt is then mixed with a sodium hypochlorite solution having a chlorine content of 10–23 percent in the proportion required to provide, in the final product, about 0.25 mole of sodium hypochlorite per mole of trisodium phosphate.

A solution of NaOCl can be prepared by reacting a NaOH solution with $Cl_2$ gas until an available $Cl_2$ content of about 15–16 percent was obtained. Chlorine content is determined by titration with standardized sodium thiosulfate, potassium iodide, acetic acid, and starch indicator, in accordance with conventional procedure.

I prefer to add the NaOCl to the solution of trisodium phosphate liquor and condensed phosphate immediately before cooling begins, inasmuch as the NaOCl tends to decompose more rapidly at temperatures above room temperature. If the hypochlorite is added before the condensed phosphate, the chlorine content of the final solid product will usually be lower. While the phosphate liquor may be maintained at a temperature within the approximate 80–100° C. range, it is most convenient to operate at the lowest possible temperature at which the salts remain in solution, preferably 80–90° C., to retard decomposition of the NaOCl during crystallization.

In the foregoing description of preparing a new product in accordance with this invention, I have described the initial preparation of both the TSP and NaOCl which were thereafter combined with the secondary phosphate. It is of course contemplated that these components could, if desired, be purchased, and used in the preparation of the new composition.

The invention is further illustrated by the following specific but non-limiting examples.

*Example 1*

This example shows the preferred procedure for forming the triple salt of this invention. 120 g. of NaOH was dissolved in 144 g. of water and cooled to room temperature. With good agitation 98 g. of $H_3PO_4$ was slowly added, the solution temperature rising to from 90–100° C. during the acid addition. With continued agitation, 7.8 g. of $Na_5P_3O_{10}$ (2 wt. percent of the final composition) was added to the phosphate liquor and dissolved therein. The temperature of the solution or melt was then permitted to drop to 80–90° C., and 54.3 g. of NaOCl with an available $Cl_2$ of 16.0% was added to the melt with continued agitation. Agitation was continued as the melt was cooled to room temperature. The product was homogeneous crystals having the mole ratios of components as follows:

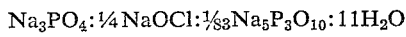

$Na_3PO_4 : \frac{1}{4} NaOCl : \frac{1}{83} Na_5P_3O_{10} : 11 H_2O$

Using the same procedure, addition of 0.1, 1.0 and 5.0 wt. percent $Na_5P_3O_{10}$ to the liquor produces triple salts having condensed phosphate to trisodium phosphate mole ratios of 1/1708, 1/169, and 1/32 respectively.

*Example 2*

In this example, the procedure of Example 1 is followed but 0.1, 1.0, 2.0 and 5.0 wt. percent portions of $Na_4P_2O_7$ rather than sodium tripolyphosphate are added to the liquor. The triple salt crystalline products formed have the following condensed phosphate to trisodium phosphate mole ratios:

| $Na_4P_2O_7$, wt. percent: | $Na_4P_2O_7/Na_3PO_4$, moles/mole |
|---|---|
| 0.1 | 1/699 |
| 1.0 | 1/69 |
| 2.0 | 1/34 |
| 5.0 | 1/13 |

*Example 3*

In this example, the procedure of Example 1 is followed but 0.1, 1.0, 2.0 and 5.0 wt. percent $(NaPO_3)_6$ rather than sodium tripolyphosphate are added to the trisodium phosphate liquor. The triple salt crystalline products formed have the following condensed phosphate to trisodium phosphate mole ratios:

| $(NaPO_3)_6$, wt. percent: | $(NaPO_3)_6/Na_3PO_4$, moles/mole |
|---|---|
| 0.1 | 1/3080 |
| 1.0 | 1/305 |
| 2.0 | 1/151 |
| 5.0 | 1/58 |

Depending upon the chlorine content of the NaOCl solution, the chlorine content of the product may be from about one up to about 5.0 percent. Heretofore, commercial chlorinated TSP has been practically limited to a $Cl_2$ content of about 4 percent; surprisingly, products in accordance with this invention have excellent chlorine stabilities even with chlorine contents of about 5 percent. Typically, products in accordance with this invention, both in the solid state and in solution, demonstrate chlorine stabilities which are considerably better than that of conventional chlorinated trisodium phosphate of lesser chlorine content. This may be seen graphically by reference to the accompanying drawing, which illustrates the change with time of the chlorine content of several compositions in accordance with this invention, as compared with that of conventional chlorinated trisodium phosphate.

In the chart, the percent of initial chlorine content which remains available at a given time subsequent to preparation of the composition is indicated on the vertical axis, and the number of days elapsed following production of the composition is shown on the horizontal axis. Curve G illustrates the rapid decline of the available chlorine content of standard commercially produced chlorinated trisodium phosphate. Line A, by way of contrast, shows the stability of the chlorine content of the triple salt of chlorinated trisodium phosphate and 2 percent sodium tripolyphosphate, prepared in the manner previously described. The apparent increase in chlorine content is accounted for by the fact that there was actually a slight loss of moisture from the crystals, while little if any chlorine was lost, so that, relative to the weight of the material, chlorine content in percent increased. Comparison of Curves A and G illustrates the great improvement in chlorine stability effected by preparing the chlorinated trisodium phosphate in combination with a small quantity of sodium tripolyphosphate (STP). Curve B shows the chlorine content of another sample of chlorinated trisodium phosphate and 2 percent STP; because of slight variations in process conditions, chlorine stability was not quite as good, but was still far better than that of conventional chlorinated TSP. Curve C shows the stability of the triple salt of chlorinated trisodium phosphate and 2 percent $Na_5P_3O_{10}$, wherein the sodium hypochlorite had a chlorine content of about 21 percent, higher than is normally used in practice. Chlorine content decreased more rapidly than in the instances illustrated by Curves A and B, but was still much better than the decrease in the chlorine content of commercial chlorinated trisodium phosphate of lower chlorine content, as indicated by Curve G. Curve D shows the decline in chlorine content of a crystallized product produced by combining chlorinated trisodium phosphate liquor with a mixture of 1 percent sodium tripolyphosphate and 1 percent tetrasodium pyrophosphate. Curve E relates to the crystallized triple salt of chlorinated trisodium phosphate and 2 percent tetrasodium polyphosphate, while Curve F relates to the decline in chlorine content of a mechanical mixture of chlorinated trisodium phosphate and 2 percent $Na_5P_3O_{10}$. By comparison of this curve and Curve A, it will be seen that the composition produced by crystallization of a solution of TSP, NaOCl and $Na_5P_3O_{10}$ has substantially better chlorine stability in the solid state than a mechanical mixture of chlorinated TSP and the secondary phosphate, although the mixture does have better chlorine stability than commercial chlorinated trisodium phosphate.

Although I prefer to use about 2 percent sodium tripolyphosphate in combination with the chlorinated trisodium phosphate, proportions up to about 5 percent of the tripolyphosphate are suitable. Alternately, tetrasodium pyrophosphate may be used in proportions up to about 5 percent, or sodium hexametaphosphate may be used in proportions up to about 5 percent, although the latter compounds do not appear to given as good results as sodium tripolyphosphate. Mixtures of one or more of these phosphate totaling up to rougly about 5 percent of the TSP content are within the scope of the invention.

Present evidence indicates that use of phosphate salts of alkali metals other than sodium are not as desirable as the corresponding sodium salts. A number of potassium compounds have been tested and found to be less effective in their effect upon loss of chlorine content. Incorporation of the hypochlorite in the form of KOCl is unsatisfactory because of its poor stability in warm aqueous solution.

It is my present belief that the secondary phosphate is incorporated in the new composition as a part of the water of hydration, and that a true triple salt is formed. This belief is based in part on the fact the product obtained by crystallization of the solution of TSP, NaOCl and the secondary phosphate demonstrates a different chlorine stabiltiy than a mechanical mixture of the same compounds in the same proportions. Other tests, based upon tracing the $Na_5P_3O_{10}$ by combination with $KMnO_4$, indicate that a homogeneously colored crystalline product is formed, suggesting that the $Na_5P_3O_{10}$ is actually combined in the chlorinated TSP crystals. This is confirmed by X-ray diffraction tests of the triple salt. Infrared spectrophotometer traces of the product produced by crystallization from solution and a mechanical mixture show different peaks. This also indicates the existence of new composition.

From the foregoing it will be apparent that this invention is based upon the discovery of a new composition of matter which is of utility similar to conventional chlorinated trisodium phosphate, but which has a substantially better chlorine stability.

I claim:

1. A hydrated triple salt which is a member selected from the group consisting of triple salts having the following empirical formulae, expressed in terms of mole ratios of components:

(a) $Na_3PO_4:0.25NaOCl:0.0005-0.032Na_5P_3O_{10}:10.5-11.5H_2O$
   (b) $Na_3PO_4:0.25NaOCl:0.0014-0.077Na_4P_2O_7:10.5-11.5H_2O$
   (c) $Na_3PO_4:0.25NaOCl:0.003-0.018(NaPO_3)_6:10.5-11.5H_2O$

2. The hydrated triple salt of claim 1 wherein the empirical formula of the triple salt, expressed in terms of mole ratios of components, is:

$Na_3PO_4:0.25NaOCl:0.0005-0.032$ $Na_5P_3O_{10}:10.5-11.5H_2O$

3. The hydrated triple salt of claim 1 wherein the empirical formula of the triple salt, expressed in terms of mole ratios of components is:

$Na_3PO_4:1/4NaOCl:1/83Na_5P_3O_{10}:11H_2O$

4. The hydrated triple salt of claim 1 wherein the empirical formula of the triple salt, expressed in terms of mole ratios of components is:

$Na_3PO_4:0.25NaOCl:0.0014-0.077$ $Na_4P_2O_7:10.5-11.5H_2O$

5. The hydrated triple salt of claim 1 wherein the empirical formula of the triple salt, expressed in terms of mole ratios of components is:

$Na_3PO_4:0.25NaOCl:0.003-0.018(NaPO_3)_6:10.5-11.5H_2O$

6. A method for preparing a chlorinated trisodium phosphate-condensed phosphate hydrated triple salt comprising
   (a) mixing trisodium phosphate liquor with 0.1 to 5 percent, based on the weight of the final product triple salt, of a condensed phosphate selected from the group consisting of sodium tripolyphosphate, tetrasodium pyrophosphate and sodium hexametaphosphate,
   (b) adding an aqueous solution of sodium hypochlorite having a chlorine content of 10 to 23% to the liquor at a temperature of from 80–100° C., and
   (c) immediately cooling the liquor, thereby forming a crystalline triple salt product.

7. The method of claim 6 wherein the sodium hypochlorite is added when the liquor temperature is from 80–90° C.

8. The method of claim 6 wherein the condensed phosphate is sodium tripolyphosphate.

9. The method of claim 6 wherein the condensed phosphate is tetrasodium pyrophosphate.

10. The method of claim 6 wherein the condensed phosphate is sodium hexametaphosphate.

References Cited

UNITED STATES PATENTS

| | | | |
|---|---|---|---|
| 1,555,474 | 9/1925 | Mathias | 252—99 XR |
| 2,524,394 | 10/1950 | Madorsky | 23—86 |
| 2,536,456 | 1/1951 | Miller | 252—187 XR |
| 2,756,214 | 7/1956 | Albrecht | 252—94 |

LEON D. ROSDOL, *Primary Examiner.*

MAYER WEINBLATT, *Examiner.*